US010613635B2

(12) United States Patent
Deng et al.

(10) Patent No.: US 10,613,635 B2
(45) Date of Patent: Apr. 7, 2020

(54) METHOD AND APPARATUS FOR GENERATING MOTOR BRAKE SIGNAL

(71) Applicant: AAC Technologies Pte. Ltd., Singapore (SG)

(72) Inventors: Hanlin Deng, Shenzhen (CN); Xiang Lu, Shenzhen (CN); Zheng Xiang, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 0 days.

(21) Appl. No.: 16/236,296

(22) Filed: Dec. 28, 2018

(65) Prior Publication Data

US 2019/0204922 A1 Jul. 4, 2019

(30) Foreign Application Priority Data

Jan. 4, 2018 (CN) .......................... 2018 1 0006512

(51) Int. Cl.
| | |
|---|---|
| *G06F 3/01* | (2006.01) |
| *H04M 1/725* | (2006.01) |
| *H04M 19/04* | (2006.01) |
| *H02K 7/06* | (2006.01) |

(52) U.S. Cl.
CPC ............ *G06F 3/016* (2013.01); *H02K 7/063* (2013.01); *H04M 1/72569* (2013.01); *H04M 19/047* (2013.01); *H04M 2250/12* (2013.01)

(58) Field of Classification Search
CPC .... G06F 3/016; H02K 7/063; H04M 1/72569; H04M 2250/12; G08B 6/00; A63F 13/285; H02P 25/032
See application file for complete search history.

(56) References Cited

U.S. PATENT DOCUMENTS

| | | | | |
|---|---|---|---|---|
| 2011/0102162 | A1* | 5/2011 | Gregorio ................ | G06F 3/016 340/407.2 |
| 2012/0188180 | A1* | 7/2012 | Yang ...................... | G06F 3/016 345/173 |
| 2014/0118126 | A1* | 5/2014 | Garg ...................... | G06F 3/016 340/407.1 |
| 2016/0162025 | A1* | 6/2016 | Shah ...................... | G06F 3/016 345/156 |
| 2017/0052593 | A1* | 2/2017 | Jiang ...................... | G06F 3/016 |

* cited by examiner

*Primary Examiner* — Mirza F Alam
(74) *Attorney, Agent, or Firm* — IPro, PLLC; Na Xu

(57) ABSTRACT

Embodiments of the present disclosure relate to the technical field of electronic devices, and a method for generating a motor brake signal is disclosed. In the present disclosure, the method for generating a motor brake signal includes the following steps: S1: controlling a motor by using different brake signals respectively to obtain vibration margins of the motor corresponding to the brake signals; and S2: selecting, from the brake signals, a brake signal with superior performance as the motor brake signal based on the vibration margins of the motor, wherein the smaller the vibration margin of the motor is, the more superior performance the corresponding brake signal has. The present disclosure further provides an apparatus for generating a motor brake signal. The method and the apparatus for generating a motor brake signal that are provided in the present disclosure enable the motor to have a good brake effect.

5 Claims, 6 Drawing Sheets

… (US 10,613,635 B2)

METHOD AND APPARATUS FOR GENERATING MOTOR BRAKE SIGNAL

TECHNICAL FIELD

Embodiments of the present disclosure relate to the technical field of electronic devices, and in particular, to a method and an apparatus for generating a motor brake signal.

BACKGROUND

As more and more mobile phone manufacturers launch full-screen products, consumers begin to pay attention to this new form of future mobile phones, i.e. full screen mobile phones, and the times for full-screen finally comes. It is an inevitable development trend to replace physical keys on a mobile phone with virtual keys, so that not only the stunning visual effect and the amazing appearance brought by a full screen are ensured, but also more practical functional features are provided. The virtual button refers to that when a key-pressing is performed in a key area by a user, a mobile phone responds with short-time vibration satisfying a requirement on vibration sense intensity. In order to achieve this short-time vibration effect, motor brake is one of the key techniques, which precisely controls to weaken the motor vibration until it stops. In the prior art, the resonance frequency of the motor is obtained by monitoring the zero-crossing point of the back electromotive force when the motor is freely vibrating, and a signal having the resonance frequency and with a polarity opposite to the back electromotive force is input to the motor, so to achieve the braking.

There are at least the following problems in the prior art: there are a variety of variations in the frequency and amplitude of the short signal waveform for implementing vibration effect by the virtual keys of the mobile; during actual use, brake implemented by using a single resonance frequency signal is not efficient, and cannot quickly stop motor vibration; and there would be a reverse acceleration if the signal amplitude is incorrectly adjusted, and consequently, the motor cannot have a good brake effect.

BRIEF DESCRIPTION OF THE DRAWINGS

One or more embodiments are exemplarily described with reference to figures in the accompanying drawings corresponding to the embodiments. These exemplary descriptions do not constitute a limitation on the embodiments. Components having the same reference numeral in the accompanying drawings are represented as similar components. Unless particularly stated, the figures in the accompanying drawings do not constitute a scale limitation.

DETAILED DESCRIPTION

To make the objects, technical solutions, and advantages of the embodiments of the present disclosure clearer, the embodiments of the present disclosure will be described in detail with reference to the accompanying drawings as follows. However, those skilled in the art will understand that many technical details are provided in the embodiments of the present disclosure to facilitate the understanding of the reader to the present disclosure. However, the technical solutions sought to be protected by the present disclosure could be implemented even without such technical details and various changes and modifications based on the following embodiments.

Figure 1:
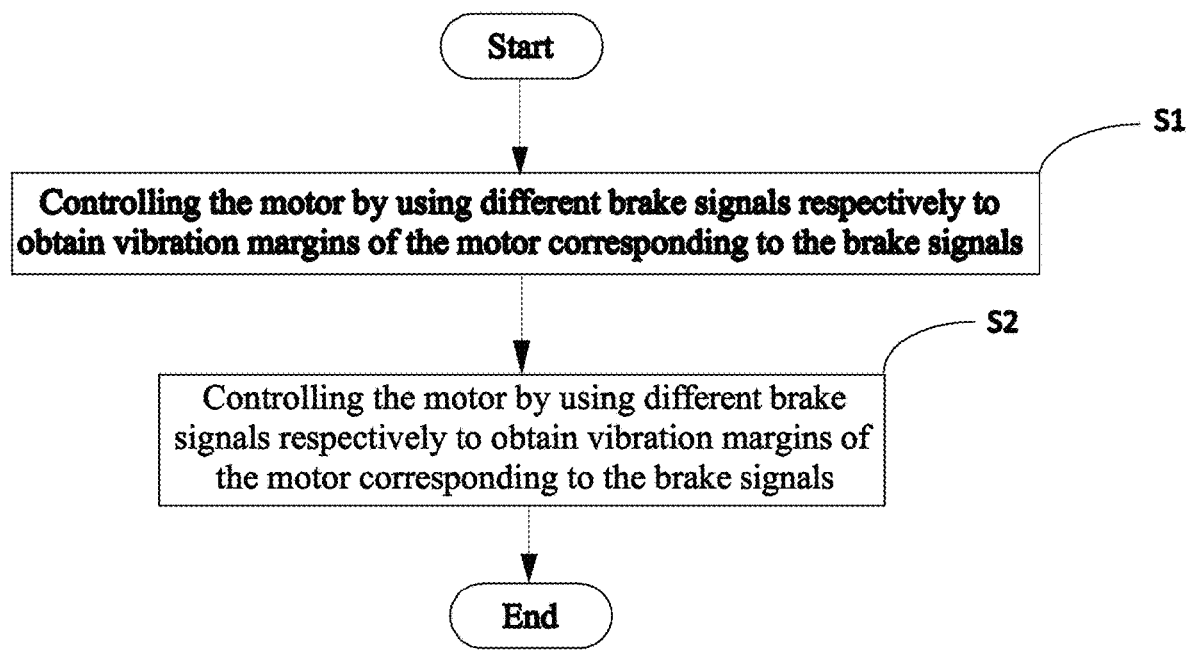
FIG. 1 is a flowchart of a method for generating a motor brake signal according to the first embodiment of the present disclosure.

The first embodiment of the present disclosure relates to a method for generating a motor brake signal. The specific process is shown in FIG. 1.

At S1, the motor is controlled by using different brake signals respectively so as to obtain vibration margins of the motor corresponding to the brake signals.

Specifically, in step S1, the brake signal may be a drive signal with a fixed waveform, such as, a rectangular-wave drive signal or a sine wave drive signal. The method for generating different brake signals may comprise: generating an initial brake signal based on preset signal parameters, wherein the signal parameters include a signal duration and a signal amplitude; adjusting the signal parameters with a preset step at least once; and generating a new brake signal based on the adjusted signal parameters each time after the signal parameters are adjusted. It shall be understood that the different brake signals include the initial brake signal and the new brake signals generated each time after the signal parameters are adjusted. Specific parameters for the brake signals, such as amplitude and frequency, may be adjusted according to actual situations, so that the motor has an optimal brake effect.

It should be noted that the generating an initial brake signal based on preset signal parameters may preferably comprises generating an initial brake signal with a preset minimum signal duration and a preset minimum signal amplitude. The signal parameters may be adjusted with a preset step at least once in the following way: maintaining the signal amplitude at the minimum signal amplitude, and gradually adjusting the signal duration by a preset first step until the adjusted signal duration is closest to a preset upper limit for duration; and maintaining the signal duration at a signal duration after the final adjustment, and gradually adjusting the signal amplitude by a preset second step until the adjusted signal amplitude is closest to a preset upper limit for amplitude.

Figure 2:
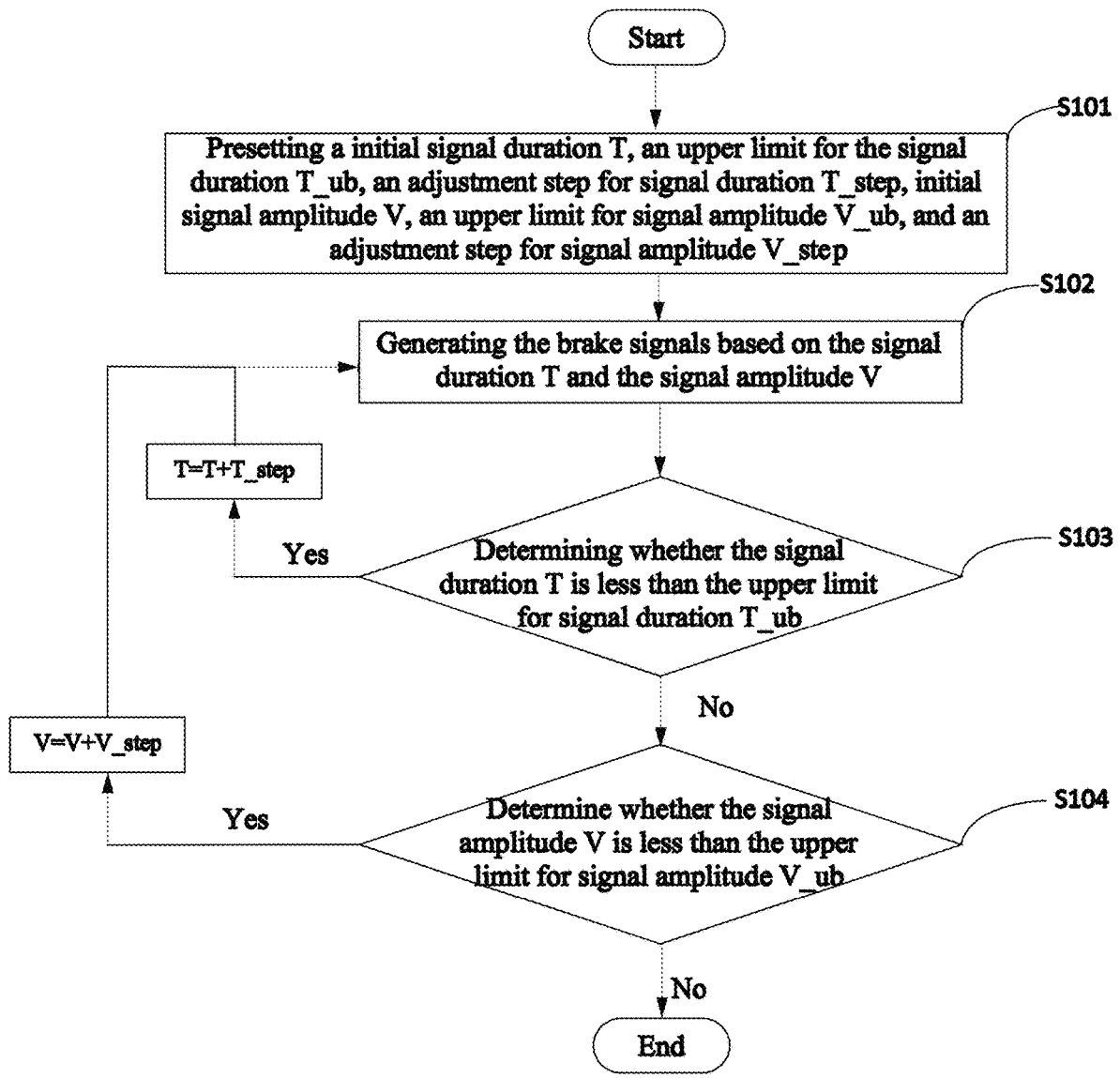
FIG. 2 is a flowchart of a method for generating different motor brake signals according to the first embodiment of the present disclosure.

For ease of understanding, as shown in FIG. 2, the foregoing method for obtaining the brake signals specifically includes the following steps:

At S101, the following parameters are preset: an initial signal duration T, an upper limit for signal duration T_ub, an adjusting step for signal duration T_step, an initial signal amplitude V, the upper limit for signal amplitude V_ub, and an adjusting step for signal amplitude V_step.

At S102, the brake signals are generated based on the signal duration T and the signal amplitude V.

At S103, the signal duration T is set as T=T+T_step if the signal duration T is determined to be less than the upper limit for signal duration T_ub, and the process then returns to S102 for execution until the signal duration T is greater than or equal to the upper limit for signal duration T_ub to perform step S103.

At S104, the signal amplitude V is set as V=V+V_step if the signal amplitude V is determined to be less than the upper limit for signal amplitude V_ub, and the process then returns to S102 for execution until the signal amplitude V is greater than or equal to the upper limit for signal amplitude V_ub, and the process ends.

It shall be understood that all of the first step, the second step, the upper limit for signal duration, and the upper limit for signal amplitude may be preset, in other words, the number of new brake signals generated with the adjustment of the signal parameters may be selected at will. The steps may be appropriately increased or the upper limit for signal duration and the upper limit for signal amplitude may be appropriately decreased while maintaining the good brake effect for the motor, so that there is no need for the motor to be controlled by excessive brake signals so as to select a brake signal with good performance therefrom, thereby improving work efficiency of the motor.

At S2, a brake signal with superior performance is selected from the brake signals as the motor brake signal based on the vibration margins of the motor, wherein, the smaller vibration margin of the motor is, the more superior performance the corresponding brake signal has.

Specifically, in step S2, a brake signal with optimal performance or suboptimal performance may be selected based on actual situations, both of which could improve the brake effect of the motor.

It should be noted that the brake signal with superior performance may be further selected as the motor brake signal based on a vibration velocity of the motor. The smaller the vibration velocity of the motor is, the more superior performance the corresponding brake signal has. In this embodiment, the vibration velocity of the motor may be calculated based on a back electromotive force generated during motor vibration. Alternatively, the vibration velocity of the motor may be measured directly in other ways, for example, by using physical means such as a velocity sensor.

The motor is controlled with the different brake signals respectively to obtain the vibration margins of the motor corresponding to respective brake signals, namely, the maximum vibration amounts of the motor corresponding to the respective brake signals when the brake signals end. The smaller the maximum vibration amount of the motor is, the more superior performance the corresponding brake signal has. As the durations of the brake signals on the motor are consistent, a brake signal with superior performance is selected as the motor brake signal so that the vibration of the motor decreases greater within the same period, and thus a more significant brake effect is obtained. In addition, the motor is controlled by brake signals with different frequencies respectively, avoiding low efficiency of the motor brake due to a single frequency of the brake signals, thereby the motor may obtain a good brake effect.

Figure 3:
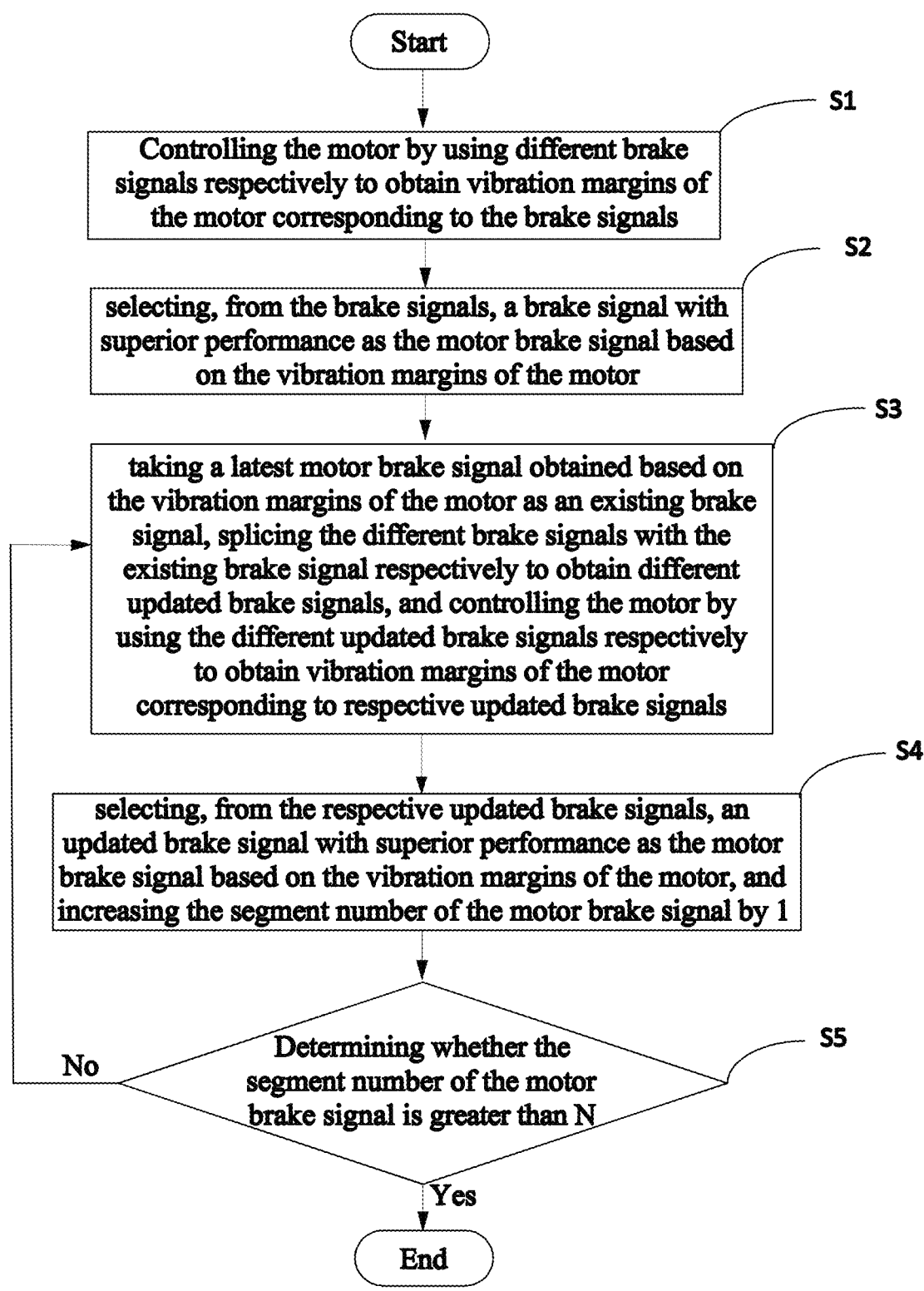
FIG. 3 is a flowchart of a method for generating a motor brake signal according to the second embodiment of the present disclosure.

The second embodiment of the present disclosure relates to a method for generating a motor brake signal. This embodiment is further improved based on the first embodiment. Specific improvements lie in that: in this embodiment of the present disclosure, a segment number N of the motor brake signal to be generated is greater than 1; and the motor brake signal obtained in step S2 is a first-segment motor brake signal. Segmentation processing to the motor brake signal would overcome the deficiency of reverse acceleration of the motor due to incorrect adjustment of the signal parameters when directly processing the integral motor brake signal. As processing to the motor brake signal is more precise, the motor has a better brake effect after the processed motor brake signal is input into the motor. The specific process of this embodiment is shown in FIG. 3, including the following steps:

At S1, the motor is controlled by using different brake signals respectively so as to obtain vibration margins of the motor corresponding to the brake signals.

At S2, a brake signal with superior performance is selected, as the motor brake signal, namely, a first-segment motor brake signal, from the brake signals based on the vibration margins of the motor.

The step S1 and step S2 has already been described in details in the first embodiment of the present disclosure. Details thereof are not described herein again.

At S3, a latest motor brake signal obtained based on the vibration margins of the motor is taken as an existing brake signal, and the different brake signals are spliced with the existing brake signal respectively to obtain different updated brake signals; and the motor is controlled by using the different updated brake signals respectively so as to obtain vibration margins of the motor corresponding to the respective updated brake signals.

Specifically, in step S3, the different brake signals are respectively spliced with the existing brake signal to obtain the different updated brake signals, and then the updated brake signals are respectively input into the motor, so that motor vibration is rapidly decreased by a plurality of controls until the vibration stops.

S4: an updated brake signal with superior performance is selected as a motor brake signal from the updated brake signals based on the vibration margins of the motor, and the segment number of the motor brake signal is increased by 1.

S5: If the segment number of the motor brake signal obtained in step S4 is N, the motor brake signal obtained in step S4 is taken as a final motor brake signal; or if the segment number of the motor brake signal obtained in step S4 is less than N, the process returns to step S3, until the segment number of the motor brake signal obtained in step S4 is N.

For ease of understanding, the following will illustrate the steps S3 to S5 based on actual situations. For example, the initial vibration margin of the motor is 10, and the vibration margin may be decreased up to 5 after control by a first-segment brake signal. To decrease the vibration margin to 0 so as to achieve an optimal brake effect, the first-segment brake signal is taken as an existing brake signal and then spliced with the different signals to obtain different updated brake signals. An updated brake signal with superior performance is selected as the motor brake signal. For example, after the updated brake signal is input into the motor, the vibration margin of the motor may be decreased from 5 up to 3, and then an updated brake signal capable of decreasing the vibration margin to 3 is selected as the motor brake signal. The foregoing process is repeated, until the vibration margin is decreased to 0 or decreased to a range that cannot be sensed by a user, so that the motor has an optimal or a suboptimal brake effect.

Preferably, after the final motor brake signal is obtained, the motor further stores the final motor brake signal. When the motor brake is required to be controlled next time, the final motor brake signal is directly input into the motor, so that there is no need to perform the foregoing complex debugging and splicing process on the motor again, which significantly improves the work efficiency of the motor.

Figure 4:
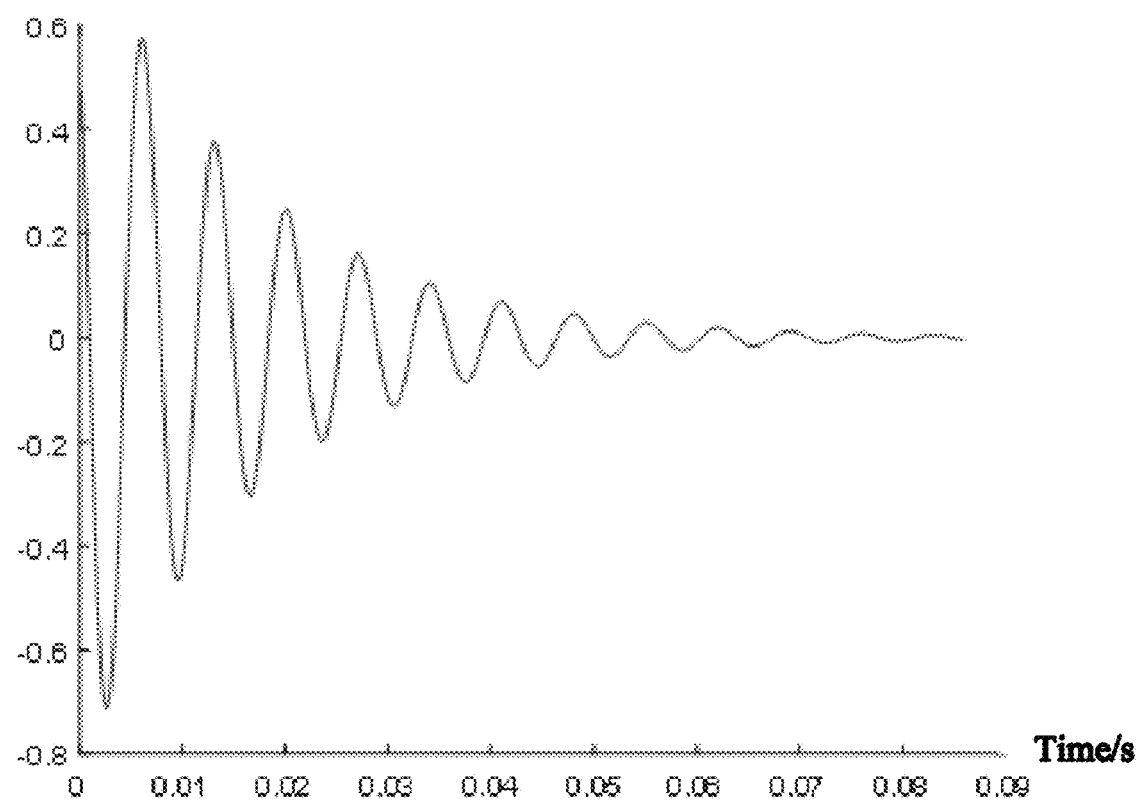
FIG. 4 is a waveform graph of a first vibration margin according to the second embodiment of the present disclosure.
Figure 5:
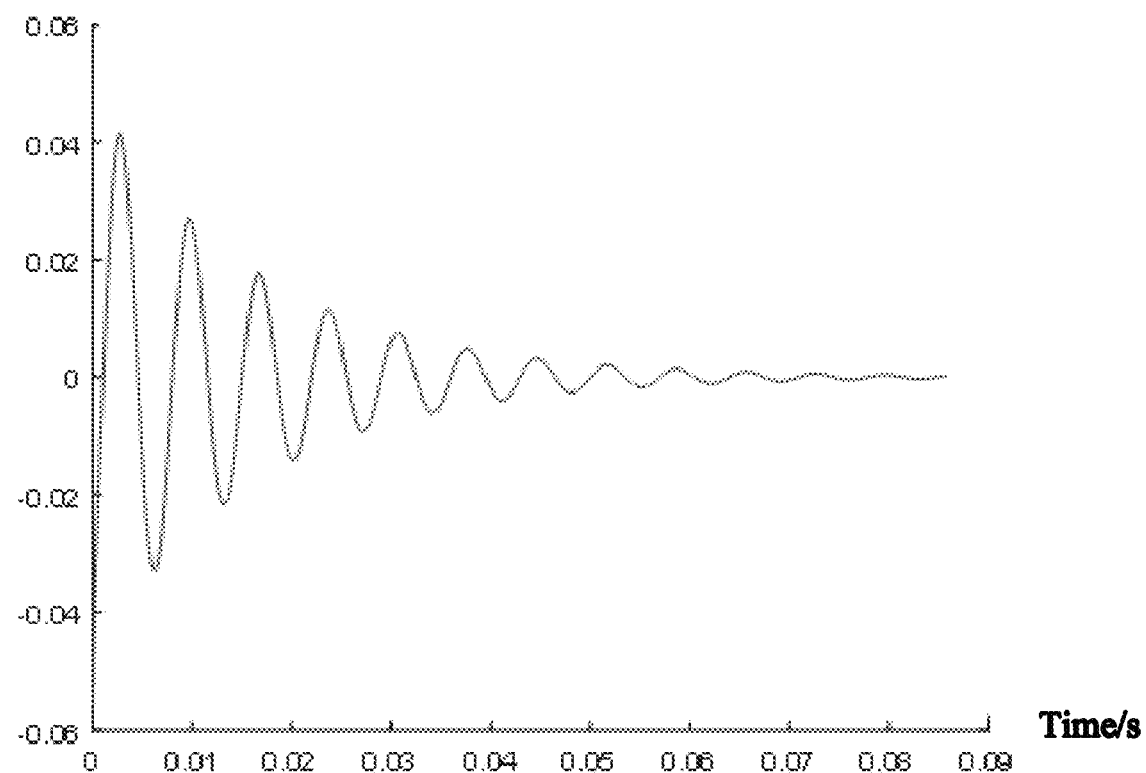
FIG. 5 is a waveform graph of a second vibration margin according to the second embodiment of the present disclosure.

The following specifically describes the effect of the embodiments of the present disclosure. FIG. 4 is a waveform graph of a first vibration margin in a technical solution using a manual brake signal. The measured upper limit of the maximum fluctuation of a motor vibration amount is 0.6 times the gravity acceleration G. It can be learned that the brake time is relatively long, and the brake effect is not good, which gives a feeling that the motor is still vibrating, and thus the signal does not achieve a precise braking effect. FIG. 5 is a waveform graph of a second vibration margin in the technical solution of the motor brake signal provided in the present disclosure. The measured upper limit of the maximum fluctuation of the motor vibration amount is less than 0.04 G, which gives a feeling that the motor has already stopped vibrating, and thus the signal achieves the precise brake effect.

Those skilled in the art would understand that, in the second embodiment of the present disclosure, the motor is controlled with the different brake signals respectively to obtain the vibration margins of the motor corresponding to respective brake signals, namely, the maximum vibration amounts of the motor corresponding to the respective brake signals when the brake signals end. The smaller the maximum vibration amount of the motor is, the more superior performance the corresponding brake signal has. As the durations of the brake signals on the motor are consistent, a brake signal with superior performance is selected as the motor brake signal, so that the vibration of the motor decreases greater within the same period, and thus a more significant brake effect is obtained. In addition, the motor is controlled by brake signals with different frequencies respectively, avoiding low efficiency of the motor brake due to a single frequency of the brake signals, thereby the motor may obtain a good brake effect.

The division of steps in the foregoing methods is only for clear description. When the steps are implemented, they may be combined into one step, or some of the steps may be split into a plurality of steps, all of the above fall within the protection scope of the present disclosure provided that the steps include the same logical relationship. Adding insignificant modifications or introducing insignificant designs to the algorithm or process without changing the core design thereof shall be considered as falling within the protection scope of the present disclosure.

Figure 6:
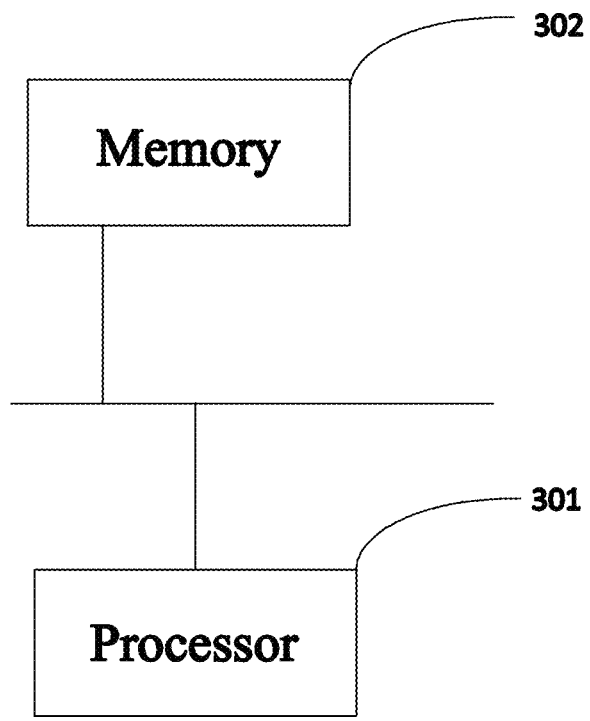
FIG. 6 is a schematic structural diagram of an apparatus for generating a motor brake signal according to the third embodiment of the present disclosure.

The third embodiment of the present disclosure relates to an apparatus for generating a motor brake signal. As shown in FIG. 6, the apparatus includes:

at least one processor 301; and a memory 302 communicatively connected with the at least one processor 301, wherein, an instruction executable by the at least one processor 301 is stored in the memory 302, and the instruction is executed by the at least one processor 301, so that the at least one processor 301 may perform the method for generating a motor brake signal according to the first and the second embodiments.

The memory 302 and the processor 301 are connected to each other via a bus. The bus may include any number of interconnected buses and bridges. The bus connects one or more processors 301 to various circuits of the memory 302. The bus may further connect various other circuits (such as peripheral devices, a voltage regulator, and a power management circuit) together. These are all commonly known in the art and thus will not be described in this description. A bus interface provides an interface between the bus and a transceiver. The transceiver may be one component, or may be a plurality of components, for example, a plurality of receivers and transmitters, and it provides a unit for communicating with various other apparatuses via a transmission medium. Data processed by the processor 301 is transmitted via a wireless medium by using an antenna. Further, the antenna further receives data and sends the data to the processor 301.

The processor 301 is used for bus management and general processing, and it may further provides various functions, including timing, a peripheral interfacing, voltage adjusting, power supply management, and other control functions. The memory 302 may be configured to store data for the processor 301 to perform operations.

The fourth embodiment of the present disclosure relates to a computer readable storage medium for storing a computer program. When being executed by a processor, the computer program performs methods according to the foregoing embodiments.

Those skilled in the art would understand that all steps or some of the steps in the methods in the foregoing embodiments may be implemented by related hardware instructed by the program. The program is stored in a storage medium, and includes several instructions to enable a device a single-chip microcomputer, a chip, or the like) or a processor to perform all steps or some of the steps in the methods in the embodiments of the present disclosure. The above storage medium may include: any medium that may store program code, such as a USB flash drive, a removable hard disk, a read-only memory (ROM), a random access memory (RAM), a magnetic disk, or a compact disc.

Those skilled in the art would understand that, the foregoing embodiments are specific embodiments for implementing the present disclosure. However, during actual applications, various changes may be made to the foregoing embodiments in terms of form and details, without departing from the spirit and the scope of the present disclosure.

What is claimed is:

1. A method for generating a motor brake signal, comprising steps of:

S1: controlling a motor by using different brake signals respectively to obtain vibration margins of the motor corresponding to the brake signals;

S2: selecting, from the brake signals, a brake signal with most superior performance as a first segment of the motor brake signal to be generated based on the vibration margins of the motor, and a total number of segments of the motor brake signal being N, wherein the smaller the vibration margin of the motor is, the more superior performance the corresponding brake signal has, N is greater than 1;

S3: taking a latest brake signal obtained based on the vibration margins of the motor as an existing brake signal, splicing the different brake signals with the existing brake signal respectively to obtain different updated brake signals, and controlling the motor by using the different updated brake signals respectively to obtain vibration margins of the motor corresponding to respective updated brake signals;

S4: selecting, from the respective updated brake signals, an updated brake signal with most superior performance as a next segment of the motor brake signal based on the vibration margins of the motor, and increasing a number of segments of the motor brake signal by 1; and S5: if the number of segments of the motor brake signal obtained in the step S4 is N, taking the motor brake signal obtained in the step S4 as a final motor brake signal; or if the number of segments of the motor brake signal obtained in the step S4 is less than N, returning to the step S3, until the number of segments of the motor brake signal obtained in the step S4 is N.

2. The method for generating a motor brake signal according to claim 1, wherein the different brake signals in the step S1 are generated in the following way:
generating an initial brake signal based on preset signal parameters, wherein the signal parameters comprise a signal duration and a signal amplitude;
adjusting the signal parameters by a preset step at least once; and
generating a new brake signal based on the adjusted signal parameters each time after the signal parameters are adjusted; and
the different brake signals comprise the initial brake signal and the new brake signals generated each time after the signal parameters are adjusted.

3. The method for generating a motor brake signal according to claim 2, wherein the generating an initial brake signal based on preset signal parameters comprises:
generating an initial brake signal with a preset minimum signal duration and a preset minimum signal amplitude; and
the adjusting the signal parameters by a preset step at least once comprises:
maintaining the signal amplitude at the minimum signal amplitude, and gradually adjusting the signal duration by a preset first step until the adjusted signal duration is closest to a preset upper limit for duration; and
maintaining the signal duration at a signal duration after a final adjustment, and gradually adjusting the signal amplitude by a preset second step until the adjusted signal amplitude is closest to a preset upper limit for amplitude.

4. The method for generating a motor brake signal according to claim 1, wherein the method further comprises: after the step S5, storing the final motor brake signal.

5. An apparatus for generating a motor brake signal, comprising:
at least one processor; and
a memory communicatively connected with the at least one processor, wherein,
an instruction executable by the at least one processor is stored in the memory, and the instruction is executed by the at least one processor, so that the at least one processor perform the method for generating a motor brake signal according to claim 1.

* * * * *